United States Patent [19]
Butts

[11] 3,820,076

[45] June 25, 1974

[54] TITLE AND INDEX GENERATOR FOR A MICROFICHE

[75] Inventor: William O. Butts, Willingboro, N.J.

[73] Assignee: Micromation Systems Inc., Landover, Md.

[22] Filed: Oct. 11, 1972

[21] Appl. No.: 296,738

[52] U.S. Cl. .................................. 340/172.5, 353/27

[51] Int. Cl. .......................... G03b 23/08, G06f 3/14

[58] Field of Search ...... 340/172.5, 324 A, 324 AD; 353/27; 95/4.5 R, 4.5 J; 178/6.7 R, 15, 30

[56] References Cited

UNITED STATES PATENTS

| | | | |
|---|---|---|---|
| 2,916,727 | 12/1959 | Jones, Jr. | 340/172.5 X |
| 3,036,291 | 5/1962 | Whittle et al. | 340/172.5 |
| 3,335,408 | 8/1967 | Oliver | 340/172.5 |
| 3,465,295 | 9/1969 | Witt et al. | 340/172.5 |
| 3,519,905 | 7/1970 | Little et al. | 340/172.5 X |
| 3,700,320 | 10/1972 | Brewer et al. | 340/172.5 X |
| 3,704,068 | 11/1972 | Waly | 353/27 X |
| 3,704,451 | 11/1972 | Pearson | 340/172.5 |
| 3,715,731 | 2/1973 | Kan | 340/172.5 |

*Primary Examiner*—Paul J. Henon
*Assistant Examiner*—Melvin B. Chapnick
*Attorney, Agent, or Firm*—Seidel, Gonda & Goldhammer

[57] ABSTRACT

A title and index generator for a microfiche system which does not require the use of software. An eye readable title is created on the microfiche by extracting a predetermined number of characters from the data to be stored on the microfiche. These characters are used to read out character patterns comprised of the constituent elements of each character from the microfiche system character generator. The character patterns comprised of constituent elements of each character are stored in a memory. Each element of a character is read out of the memory a predetermined number of times as the microfiche is traversed in the horizontal direction and a second predetermined number of times as the microfiche is traversed in the vertical direction. A character is formed on the microfiche each time the element is read out of memory. The index generator includes means for backstepping an information storage device to its starting position at the beginning of the generation of the microfiche. Once the input data device is returned to its starting position, the input device is again run in the forward direction and means is provided for extracting a predetermined number of characters from the data input at positions corresponding to preselected portions within each page of data on the microfiche. Means is provided for adding standard index information to the extracted characters and the extracted characters and index information is formed on an index page of the microfiche.

13 Claims, 12 Drawing Figures

PATENTED JUN 25 1974

3,820,076

TITLE GENERATOR (T/G)

TITLE AND INDEX GENERATOR FOR A MICROFICHE

BACKGROUND OF THE INVENTION

The present invention relates to a title and index generator for a microfiche system. More particularly, the present invention relates to a title and index generator for a microfiche system which does not require programming or the use of software.

Computer microfilm (COM) system generated microfiche is increasingly becoming the most desired microfilm medium. Microfiche or fiche is a sheet of microfilm bearing a photographic record or records on a reduced scale of printed or other graphic matter. Conventional microfiches now in vogue contain 207 pages or records plus an index page and a title along the upper edge. In order to make a record system using microfiche feasible and convenient, it is necessary to have eye readable titles on the microfiche and an index page.

In the past it was necessary to use software in order to generate the title and the index page. Data had to be recorded on a magnetic tape, called a print tape, by the use of the software which would provide both the title and the index page. Software or programming to generate this print tape was very expensive and was a major stumbling block to the wider acceptance of the use of microfiche for record keeping. In addition to the software being very expensive, the development of the software or program caused a considerable delay in placing the records on microfilm since considerable time was required in order to develop the software or program. Other attempts have been directed along the lines of incorporating the software or program into the COM system by the use of an internal minicomputer that required a minimum of a 4,000 bit memory. This approach eliminated the requirement of producing a special print tape, but increased the cost of the COM system hardware by approximately 40 percent. Therefore, there has been a long felt need for COM system hardware which will convert a standard print tape into microfiche with a title and index page.

SUMMARY OF THE INVENTION

The present invention provides a means less expensive than the prior art software techniques in order to generate a title and an index page.

A further advantage of the present invention is that it eliminates the delay which was required for programming in the process of getting the records of a business or other customer of a COM system on microfilm.

The present invention provides a still further advantage in that the records or data stored on magnetic tape do not have to be modified.

Briefly, in accordance with the present invention, apparatus is provided for generating eye readable characters on a microfiche in a system for producing microfiche. The microfiche system produces characters comprised of predetermined elements. The predetermined elements for the various characters may be generated in a character generator. A first means is provided for storing the characters or title which is to be eye readable. When the microfiche is positioned for the generation of the title, the character generator means generates the character elements of one or more characters stored in the first storage means and these character elements are stored in a second storage means. Means is provided for reading out of the second storage means each element of each character a first predetermined number of times as the system traverses the microfich in a first direction and a second predetermined number of times as the system traverses the microfiche in a second direction perpendicular to said first direction. Means is provided for generating a character on the microfiche each time an element is read out of the second storage means. Therefore, each element of the character is expanded by a first predetermined number in the first direction and by the second predetermined number in the second direction.

In accordnace with the present invention, the index page generator functions in conjunction with a reversible data storage device for supplying the input data. The index page generator comprises means for causing the reversible data storage device to return to its starting position at the beginning of the generation of the microfiche. Means are provided for extracting a predetermined number of characters from the data input train at a position corresponding to a preselected position within each page of the microfiche. Means for adding index information to the extracted characters is provided in order to form an index format. The extracted characters and the index information are then photographically formed on an index page of the microfiche.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF A PREFERRED EMBODIMENT

Figure 1:
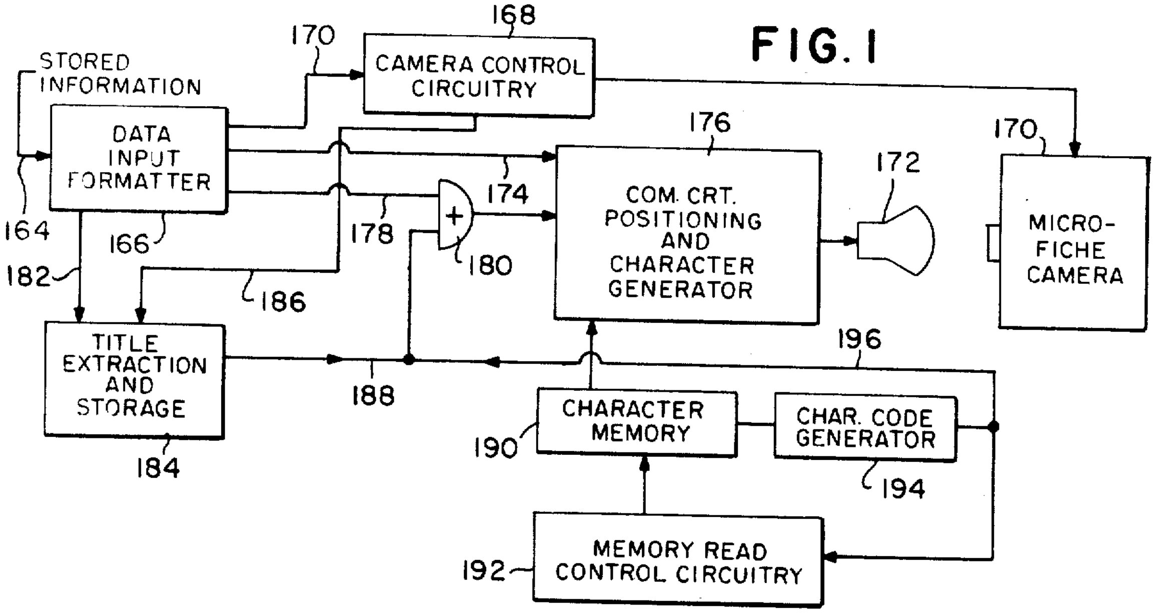
FIG. 1 is a schematic diagram, in block diagram form, of a title generator apparatus in accordance with the present invention.
Figure 12:
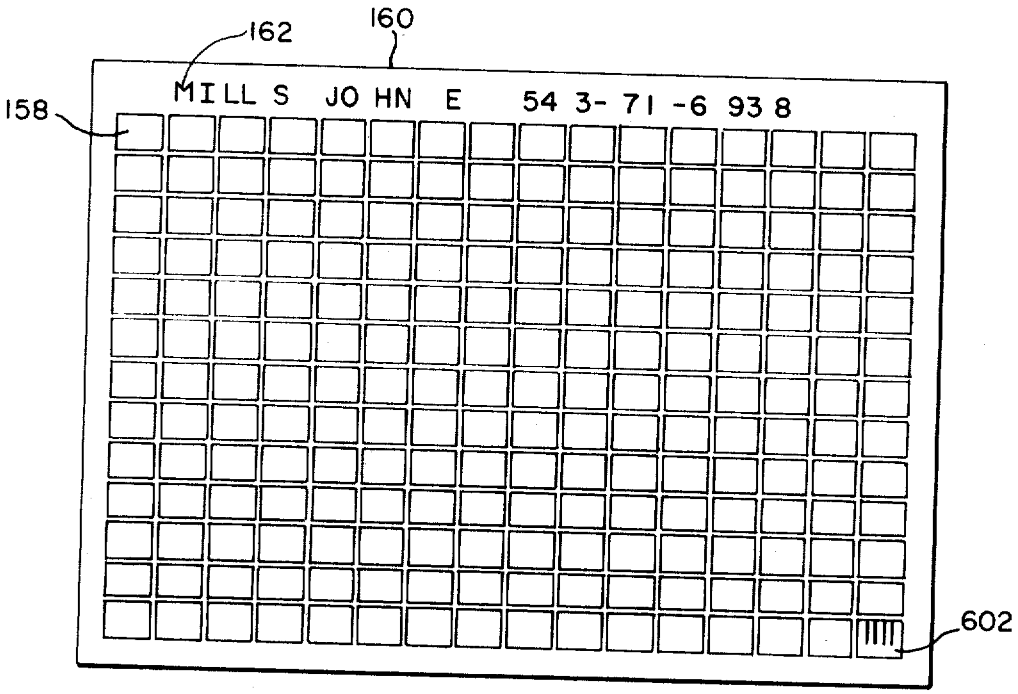
FIG. 12 is a drawing of a microfiche produced in accordance with the present invention.

Referring now to the drawings in detail, wherein like numerals indicate like elements, there is shown in FIG. 1 a title generation apparatus in accordance with the present invention which may be used to form a title on a microfiche as shown in FIG. 12. Before going into a detailed description of FIG. 1, reference may be had to FIGS. 2, 3 and 4 for an understanding of at least one arrangement of data on a magnetic tape. The description of the preferred embodiment will be described with reference to receiving the data from a magnetic tape. However, it is understood that the stored information input to the system may be obtained from any other suitable source such as a magnetic drum, magnetic disc, paper tape or any other suitable type of data storage or generation device.

Figure 2:
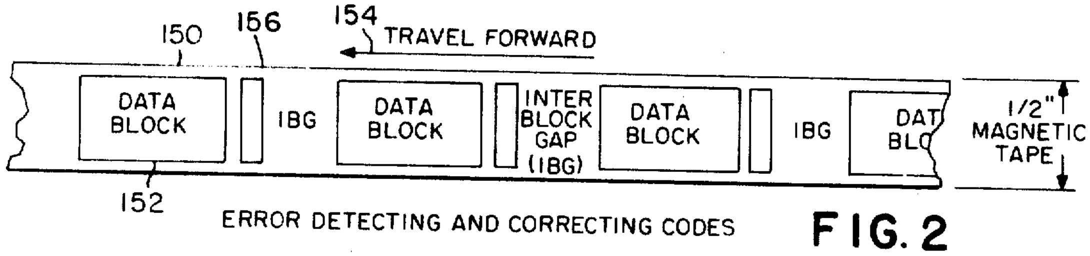
FIG. 2 is a drawing of an arrangement of data blocks on a magnetic tape.

Referring now to FIG. 2, there is shown a magnetic tape 150 having blocks of data recorded thereon and indicated as data blocks 152. The direction of forward tape travel is indicated by arrow 154. Following each data block, there is provided a space for recording error detecting and correcting codes indicated at 156. The space between the end of the error detecting and correcting codes and the beginning of the next data block is designated as the interblock gap (IBG).

Figure 3:
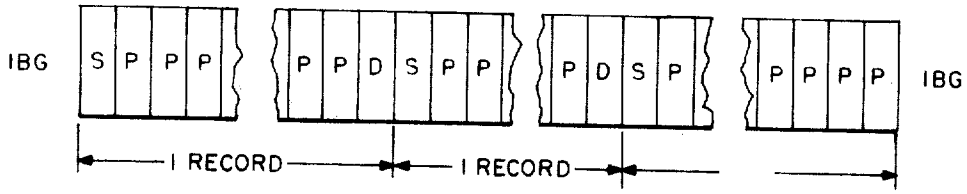
FIG. 3 is a drawing of an arrangement of characters and records within a data block on magnetic tape.

Referring now to FIG. 3, there is shown a data block comprised of a plurality of records. Each record in the data block corresponds to one line of print. In the case of microfiche, a plurality of records correspond to one page as indicated at 158 in FIG. 12. Each record in FIG. 3 is comprised of a vertical spacing control character "S". This vertical spacing control character is not printed but indicates the beginning of a new line of print. The areas indicated "P" indicate a printable character. It may be noted that a blank or space is considered to be a printable character even though nothing will be printed. Similarly, a printable character may be any other character, symbol, or other suitable indicia. The space designated "D" may be referred to as a delimiter which is not a printable character but indicates the end of the record. The delimiter may be omitted if all of the records are of a fixed or predetermined length.

Figure 4:
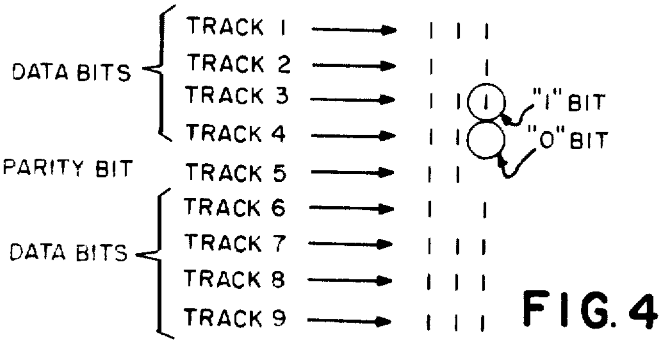
FIG. 4 is a drawing of an arrangement of data bits making up three characters on a magnetic tape.

Referring now to FIG. 4 in conjunction with FIGS. 2 and 3, there is shown an arrangement of the bit positions of three characters, That is, each character is comprised of nine bits positioned on nine tracks including a parity bit on track 5. Although nine tracks are illustrated in FIG. 4, it is understood that any other suitable number of tracks may be used. However, seven and nine track tape is at present conventionally used in data information systems. FIG. 3 is related to FIG. 4 in that each of the printable characters P and control characters S and D may be comprised of nine bit positions in nine tracks as shown in FIG. 4.

Referring now back to FIG. 1 in conjunction with FIG. 12, the apparatus shown in block diagram in FIG. 1 will generate a microfiche 160 having eye readable characters 162 thereon. The eye readable characters may serve as a title to identify the general content of the information stored in the various pages of the microfiche. Each page 158 contains a photographic image of a page of print of data stored on the tape of FIG. 3. In the exemplary microfiche shown in FIG. 12, there are 16 pages in each row and 13 pages in each column. Although the arrangement of the microfiche as shown in FIG. 12 is one which is in conventional use today and is a preferred arrangement, it is understood that various other types of arrangements may be used and that the specific arrangement of the microfiche shown herein is not intended to be limiting.

Referring to FIG. 1, the stored information from a magnetic tape via the magnetic tape transport or stored information from any other suitable device may be fed via line 164 into data input formatter 166. Data input formatter 166 supplies control signals to camera control circuitry unit 168 via line 170. One exemplary method, which will be used in illustrating the principles of the present invention, of generating the microfiche of FIG. 12 is to start microfilming at the page in the upper lefthand corner indicated as 158. The microfilming of the pages then proceeds down the first column to the last page in the first column. The first two letters of the title are then generated above the first page in the second column. The microfilming of the pages in the second column then proceeds from top to bottom. This procedure continues through the remaining 14 columns. A vertical spacing signal S is fed to the camera control circuitry 168 via line 170 at the beginning of each new record of information inputted into data input formatter 166. Camera control circuitry unit 168 contains counters and other control circuitry. Camera control circuitry unit 168 provides an output signal to microfiche camera 170 which controls the positioning of the microfiche with respect to an image formed on the face of CRT or other suitable imaging device 172. Microfiche camera 170 causes the microfiche to be moved vertically upward a distance of one page each time camera control circuitry unit 168 receives a particular vertical spacing signal S until the counters in camera control circuitry unit 168 indicate that the last page in the column has been photographed. The microfiche camera 170 in conjunction with camera control circuitry unit 168 then causes the microfiche to be positioned horizontally so that the next image will be photographically formed in the next column. At a preselected time during the photographing of the first column of pages of the microfiche a title is extracted from the information being recorded in the pages, as will be described hereinafter, and the first two letters of this information are formed on the top of the second column as will be described below.

Data input formatter 166 provides control signals via line 174 to computer output microfilming (COM) CRT positioning and character generator 176. These control signals provide information to control the positioning of characters on the CRT with respect to forming an image within the page of the microfiche being generated. Data input formatter 166 provides printable character signals P via line 178 and OR gate 180 to COM CRT positioning and character generator 176. COM CRT positioning and character generator 176 generates a character on the face of CRT 172 from constituent elements of a character in response to the digital input signal representing that particular character.

Figure 11:
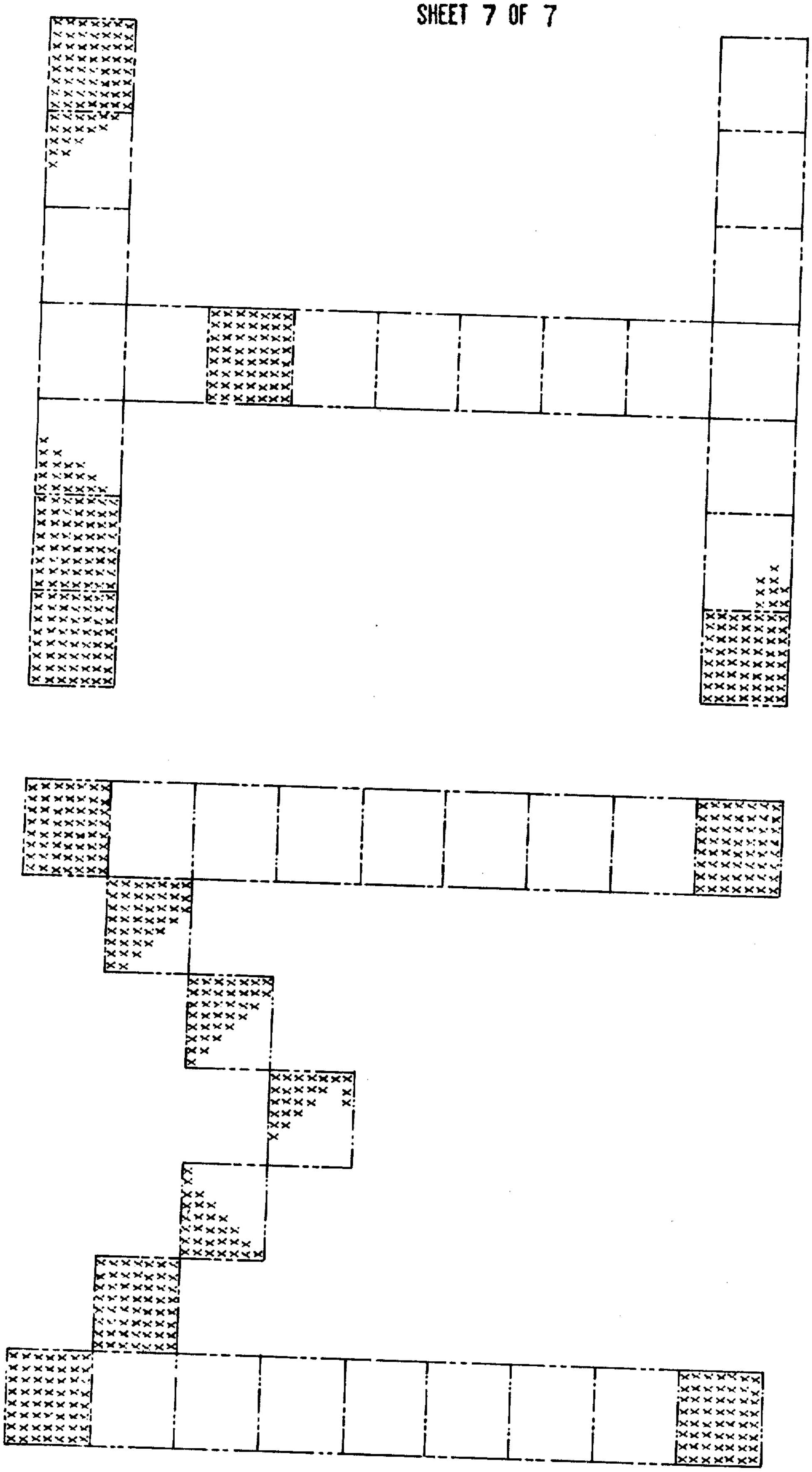
FIG. 11 is a drawing of two eye readable letters generated in accordance with the present invention.

Data input formatter 166 provides a data input signal via line 182 to title extraction and storage unit 184. Title extraction and storage unit 184 extracts a predetermined number of characters or a preselected field length starting at a predetermined point and stores these characters for use in generating an eye readable title on the microfiche. In a preferred embodiment, title extraction and storage unit 184 would select the title from one of the pages in the first column and preferably from the first page indicated at 158 in FIG. 12. A signal from camera control circuitry unit 168 is provided to title extraction and storage unit 184 via line 186. The signal on line 186 indicates that the last page of the first column of the microfiche has been photographically formed or generated on the microfiche and causes the first two characters stored in title extraction and storage unit 184 to be read out via line 188 and OR gate 180 into COM CRT positioning and character generator 176. COM CRT positioning and character generator 176 causes the constituent elements of these two characters read out of title extraction and storage unit 184 to be read into character memory 190. Memory read control circuitry 192 causes each of the constituent elements of the character to be read out of the character memory 190 a predetermined number of times as the beam of the CRT traverses the face of the CRT and the microfiche in a horizontal direction and a second predetermined number of times as the beam of the CRT continues to scan the face of the CRT and the microfiche in a vertical direction. As a specific example, each constituent element or dot used in forming the character may be read out of character memory 190 eight times as the microfiche is traversed in a horizontal direction and seven times as the microfiche is traversed in a vertical direction. The reading of the same constituent element or dot forming a portion of a character to be formed eight times in a horizontal direction and seven times in a vertical direction effectively magnifies the character by the number of times that each point is repeatedly read out. Each time the particular constituent element or dot is read out of character memory 190, character code generator 194 generates a digital representation of a selected character which is then fed via line 196 and OR gate 180 to COM CRT positioning and character generator 176. Character code generator 194 generates a digital code for one selected character which may be, as a specific example, an X, which is then used as a building block as shown in FIG. 11. As shown in FIG. 11, each X represents the size of a character normally formed on the microfiche. By using a plurality of characters for each constituent element or print of a character to be formed, the character becomes eye readable. For example, in the example being illustrated, 56 X's or other suitable characters are used for each constituent element or point defining the character to be made eye readable.

Figures 5, 7:
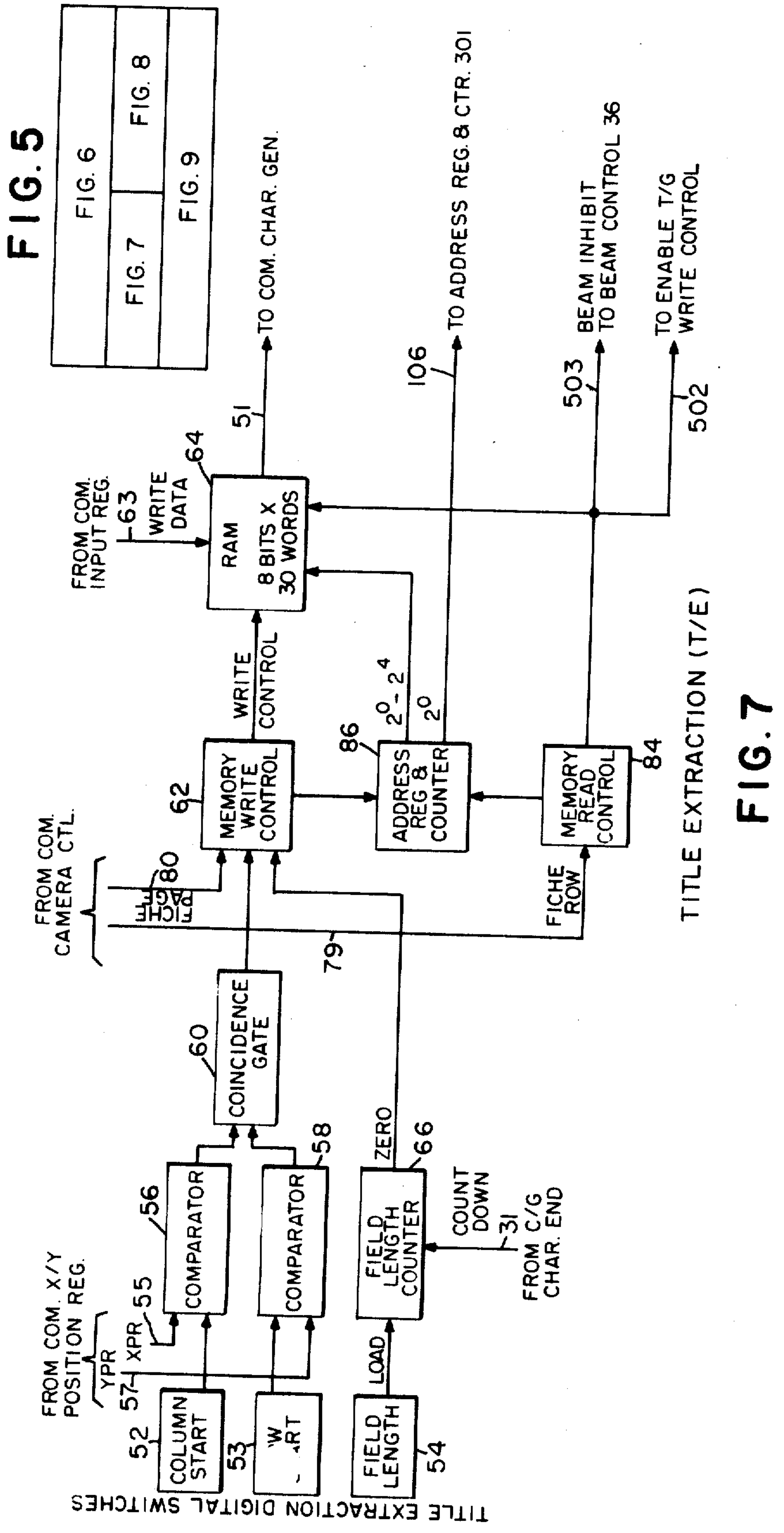
FIG. 5 is a drawing of the manner in which FIGS. 6–9 may be arranged for an easier understanding of the circuit and operation.
FIGS. 6–9 are schematic diagrams, in block diagram form, of an apparatus in accordance with the present invention.
Figure 6:
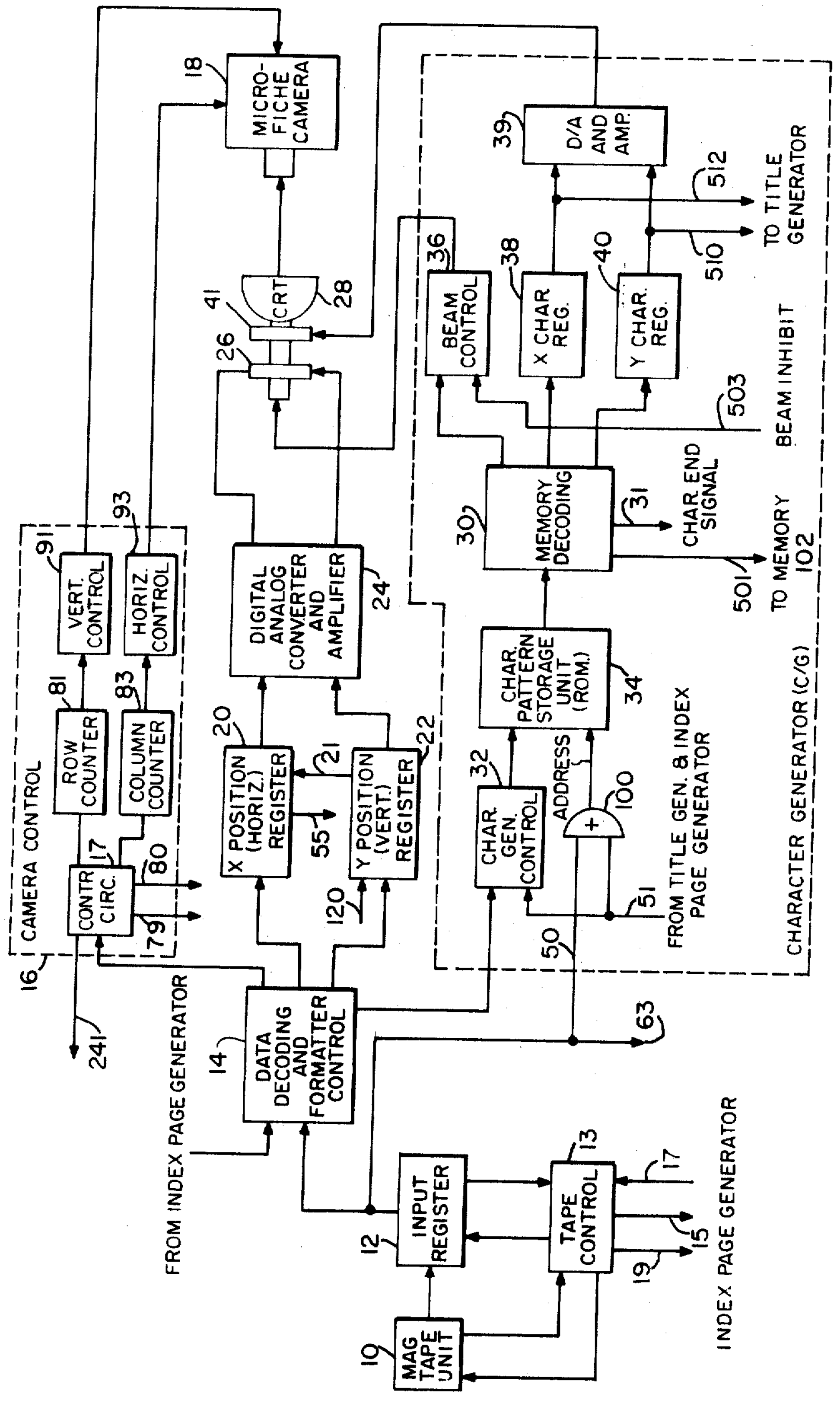

Referring now to FIGS. 5–9 for a more detailed description of title generator and the index generator, there is shown in FIG. 5 a diagram for arranging FIGS. 6–9 in a manner which will make them easier to comprehend, although such an arrangement is not necessary since all interconnecting lines have been labeled and the same line or lines connected together are identically numbered. Referring now to FIG. 6, there is shown a magnetic tape unit 10 for reading a tape as described with respect to FIGS. 2–4. The information may be stored on magnetic tape in nine channels as described in FIG. 4 which provides eight bits of information for each character. Magnetic tape unit 10 provides this information to input register 12 which functions as a buffer in connection with tape control unit 13. The output of input register 12 is fed to data decoding and formatter control 14.

In accordance with various standards such as American Standards Association (ASA) standards, a particular signal in the vertical spacing control signal S indicates that the record of information constitutes a new line of print in the case of a page printer and a new line in a page of the microfiche. In addition, another digital signal in the vertical spacing control signal S indicates that the new line is also the first line on a new page. Control signals are provided by data decoding and formatter control unit 14 to camera control unit 16, X position register 20, and Y position register 22. Camera control unit 16 generates signals to control the positioning of the microfiche in microfiche camera 18 with respect to an image formed on cathode ray tube (CRT) 28. Camera control unit 16 contains control circuitry 17, row counter 81, column counter 83, vertical control circuitry 91 and horizontal control circuitry 93. Row counter 81 has a count corresponding to the vertical positioning of the microfiche and column counter 83 has a count indicating the column or horizontal position of the microfiche. Row counter 81 provides a signal to vertical control circuit 91 which provides a control signal to microfiche camera 18. Horizontal control circuit 93 receives a signal from column counter 83 and provides a control circuit to control the vertical positioning of the microfiche in microfiche camera 18.

X position register 20 and the Y position register 22 control the horizontal and vertical positioning of a character to be photographed or photographically printed (sometimes referred to as printed) within a page of the microfiche. The outputs of the X position register 20 and Y position register 22 provide signals to digital to analog converter and amplifier 24 which in turn provides signals to yoke 26 of CRT 28.

Data decoding and formatter control 14 provides an input to character generator control unit 32. Character generator control unit 32 provides a signal to character pattern storage unit 34 which may be a read only memory. The signals supplied by character generator control unit 32 step through a character pattern which is addressed by a digital signal representing a character which is received from the output of input register 12 via line 50 and OR gate 100. The output of character pattern storage unit 34 is applied to memory decoding unit 30. Memory decoding unit 30 provides signals to beam control unit 36, X character register 38 and Y character register 40 for generating an alpha numeric character on the face of CRT 28. Beam control unit 36 controls the beam of CRT 28. X character register 38 and Y character register 40 provide signals to digital to analog converter and amplifier unit 39. The output signal of digital to analog converter and amplifier unit 39 is applied to yoke 41 of CRT 28 which causes the electron beam of CRT 28 to be deflected along the contour of the character to be recorded on the microfiche. In addition, memory decoding unit 30 provides a character end signal on line 31 and a memory pattern signal on line 501 which are used in conjunction with the title generation system. Similarly, the output of X character register 38 is present on line 512 and the output of Y character register 40 is present on line 510 which are used in addressing memory 102 in FIG. 8.

Referring now to FIG. 7, there is shown circuitry for extracting and storing a portion of the data information which will be used as an eye readable title. In most record keeping systems, a suitable title may be located at a particular position with a starting point indicated at a particular column and row. The apparatus shown in FIG. 7 will allow the extraction of a predetermined number of characters starting at a particular column and row. There is shown in FIG. 7 a column start selector 52 and a row start selector 53. The start column and start row selectors may be digital thumb wheel switches or any other suitable type of digital switch. The field length or the number of characters to be read out is selected on field length selector 54. Therefore, by setting particular numbers into column start selector 52, row start selector 53 and field length selector 54, a predetermined number of characters may be extracted from the data input train starting at a particular column and row.

The outputs of column start selector 52 and row start selector 53 are fed to comparator circuits 56 and 58, respectively, in which the selected column and row are compared for coincidence with the output of the X position register 20 on line 55 and the output of the Y position register 22 on line 57, respectively. Comparators 56 and 58 each provide an output signal to coincidence gate 60 when coincidence is detected between their respective inputs. Coincidence gate 60 produces an output when both comparators 56 and 58 detect coincidence. The output signal of coincidence gate 60 is fed to memory write control unit 62. When memory write control 62 receives an output from coincidence gate 60, memory write control 62 enables the writing of data into memory 64, which may be a random access memory, from input register 12 via line 63. In the specific example shown in FIG. 12, random access memory 64 would need a maximum capacity of 30 words having eight bits each. That is, referring to FIG. 12, since there are 16 columns and no eye readable characters are written above the first column, eye readable characters are only written above the 15 remaining columns. Two characters may be written above each column and therefore the maximum required memory would be for 30 characters. Since there are eight bits per character, this would require a maximum memory capacity of 30 words having eight bits each. Address register and counter 86 provides the addressing function for writing the data into memory 64.

Memory write control 62 removes the write signal from memory 64 after the number of characters selected on field length selector 54 have been written into memory 64. The count or digital signal set into field length selector 54 is used to set the field length counter 66 to this count. Field length counter 66 is counted down by a character end signal on line 31 from memory decoding unit 30 in FIG. 6. Memory decoding unit 30 produces a character end signal at the end of each character which is decoded and displayed on CRT 28. When field length counter 66 is counted down to zero, the signal is applied to memory write control unit 62 which removes the write signal from memory 64.

Memory write control 62 may also receive a signal from camera control 16 via line 80 which enables the writing of a signal into memory 64 only from a particular page of input information. For example, if it were desired to only take the title out of the page indicated at 158 in FIG. 12, a signal could be provided on line 80 from control circuitry 17 in camera control unit 16 which would enable memory write control only when the row counter and column counter indicated that it was at page 158.

As described thus far, memory 64 may now contain the entire title which has been extracted from a particular position, preferably in the first page of print. This title is to be made eye readable on the top of the microfiche as shown in FIG. 12. As described above with respect to FIGS. 1 and 6, the microfiche, as shown in FIG. 12, is step by step positioned vertically upward with respect to the image on the face of CRT 28. When the last page of the first column of the microfiche has been photographically printed, a signal is provided to memory read control via line 79. Usually, this signal will occur on line 79 when the row counter 81 in camera control 16 contains a count of 13. However, camera control 16 may be provided with digital switches (not shown) for selecting the number of rows and columns to be placed on the microfiche. In such a case, a signal would appear on line 79 when row counter 81 reached the preselected number of rows or pages to be placed in a vertical column. Alternatively, memory read control 84 could be energized in response to column counter 83 being stepped to the next column. When memory read control 84 senses a signal on line 79, memory read control 84 causes the reading of the first two characters or words out of memory 64 on line 51. Address register and counter 86 is operated in response to memory read control 84. Memory read control 84 also provides signals on lines 502 and 503. The signal on line 502 enables the write control for memory 102 in FIG. 8. The signal on line 503 provides an inhibit signal to beam control unit 36 to prevent the photographic printing of any characters while characters are being read out of memory 64 and processed by the character generator circuitry.

The characters read out of memory 64 are applied to character generator control 32 and OR gate 100 in FIG. 6 via line 51. The output of OR gate 100 addresses character pattern storage unit 34 and character generator control unit 32 steps through the character pattern as described with respect to the normal operation of FIG. 6. The output of character pattern storage unit 34 is similarly applied to memory decoding unit 30. The output of memory decoding unit 30 on line 501 is applied to memory 102 in FIG. 8. The output of memory decoding unit 30 is also applied to X character register 38 and Y character register 40 which provides signals on lines 512 and 510, respectively, which are used in addressing memory 102.

Figure 8:
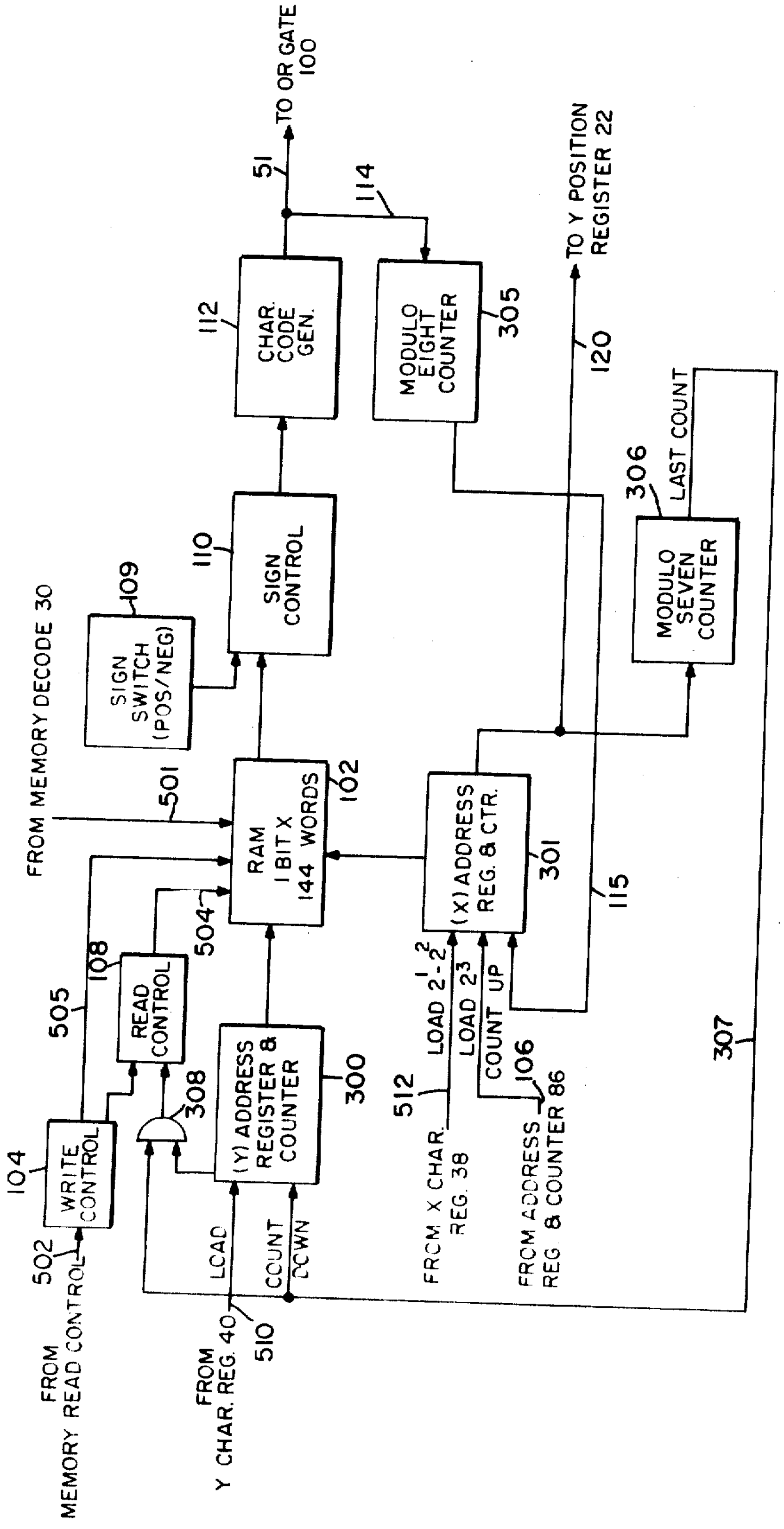
Figure 9:
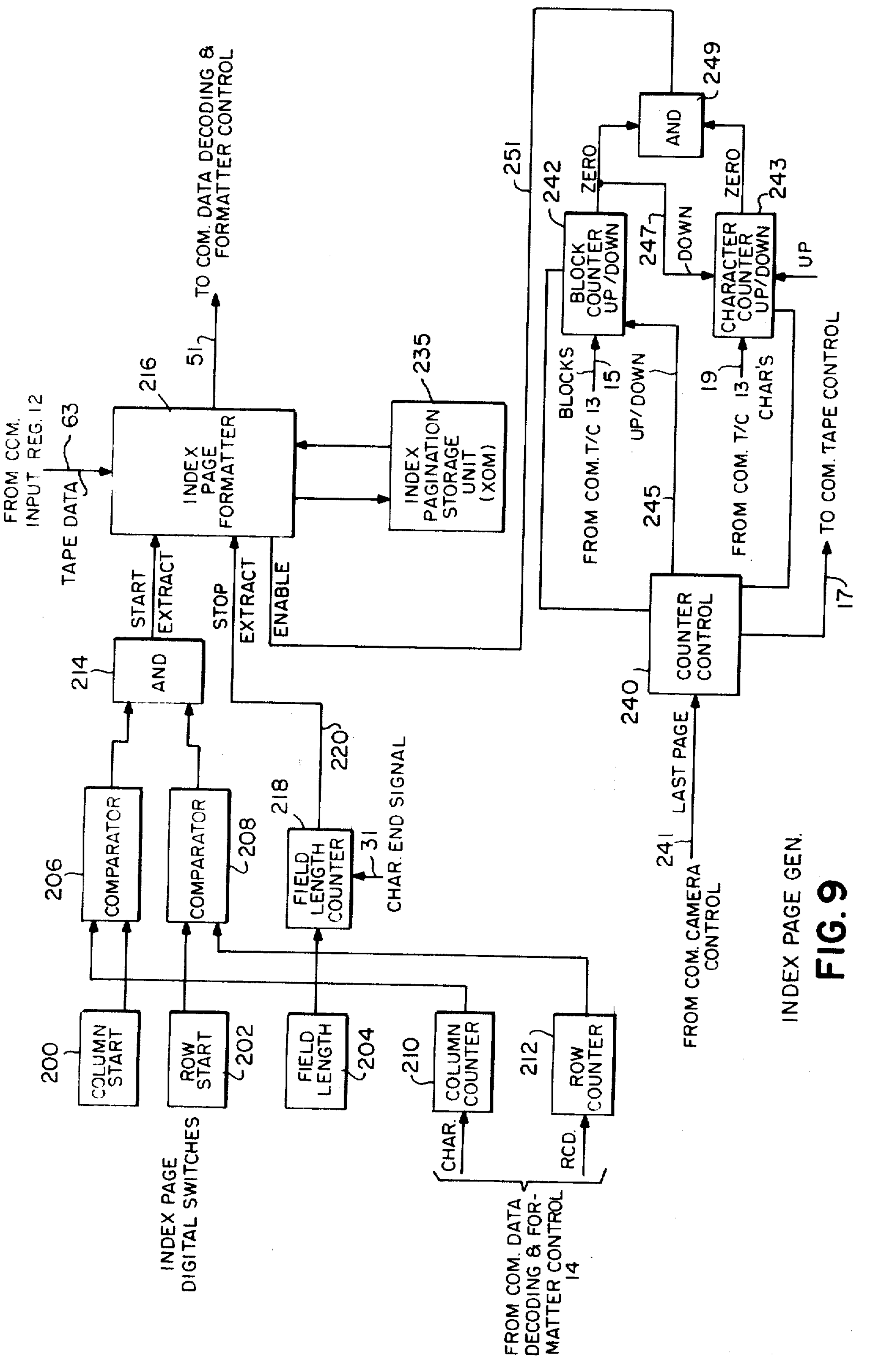
Figure 10:
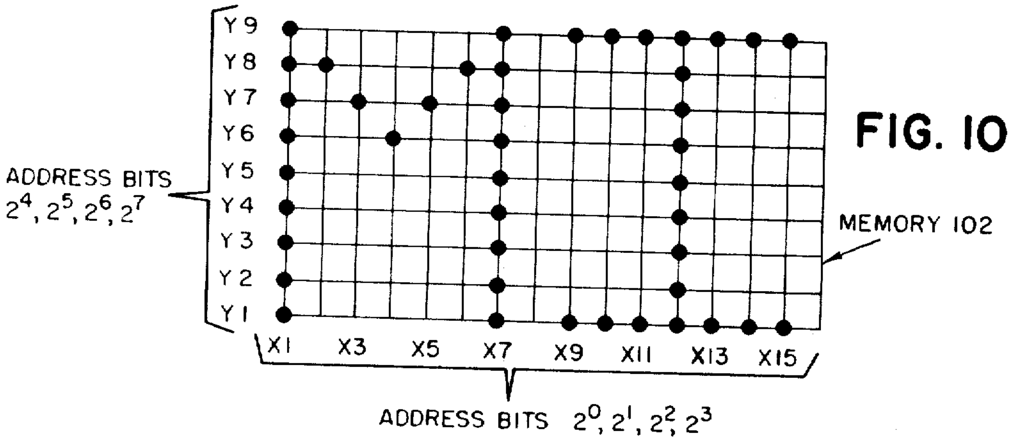
FIG. 10 is a schematic diagram of memory storage locations of memory 102 in accordance with the present invention.

Memory 102 in FIG. 8 may be a random access memory. A schematic diagram of the structure of memory 102 is shown in FIG. 10. Memory 102 in FIG. 10 is shown with dots indicating the constituent elements or binary ones stored in the particular memory locations for the first two letters "MI" read out of memory 64. In a particular example shown herein, memory 102 may be required to have a capacity of 144 words with one bit each. That is, random access memory 102 as shown in the particular example in FIG. 9 is comprised of 144 one bit words. That is, there are 144 address positions and each position contains either a 1 or a 0 which would correspond to a beam control signal at the particular position in the case where the output of memory decoding circuitry is applied to beam control unit 36 and CRT 28.

In actually writing the signal output on line 501 of memory decoding unit into memory 102, write control unit 104 receives a signal on line 502 from read control unit 84 which allows the character being read from memory decode unit 30 via line 501 to be written into random access memory 102. Address information from Y character register 40 is fed to Y address register 300 via line 510 which in turn controls the writing of the information on line 501 into the proper Y position in the memory. These address positions are shown in FIG. 10. The output of the X character register 38 is fed via line 512 into the X address register 301 which causes the data on line 501 to be written into the proper X address position in random access memory 102. However, since the output of X character register 38 on line 512 is normally used in the COM unit to define the position of the constituent elements of a single character, an additional bit of information is necessary in order to write the character into the proper half of memory 102. That is, as shown in FIG. 10, the first letter will be written into the memory positions defined between X1 and X8 and the second letter will be written into memory positions defined by X9 to X16. Therefore, an additional significant bit is necessary. This significant bit is supplied from address register and counter 301. In the example being illustrated, consistent with FIG. 12, the first two letters being read into the memory are MI and the constituent elements of these characters are shown stored in memory 102 in FIG. 10.

When the write signal on line 502 from memory read control 84 goes low, write control unit 104 inhibits further writing via line 505 and causes read control unit 108 to start the reading operation out of memory 102. That is, read control unit 108 controls memory 102 via line 504. The reading out of memory 102 starts in the upper left hand corner of memory 102 as illustrated in FIG. 10. The memory is first read horizontally. The output of memory 102 is fed to character code generator 112 via sign control unit 110. Sign control unit 110 provides an inverting function which may be selected by sign switch 109 in order to form the title on the face of the CRT 28 in either a positive or a negative appearing image. That is, the image produced on the face of CRT 28 may be positive appearing in that the letters or other characters produced thereon are dark with respect to a light background. By means of sign control 110 and sign switch 109 the image may be converted to a negative appearing image wherein light letters are produced on a dark background.

Character code generator 112 generates a character pattern which is fed into the character generator via line 51 and OR gate 100. Each time a character pattern or code is read out of character code generator 122, modulo eight counter 305 is counted or stepped via line 114. The same constituent element of the character or the same dot position is read out of memory 102 repeatedly and the same character code pattern is generated by character code generator 112 repeatedly until modulo eight counter 305 is reset. Modulo eight counter 305 is reset upon receiving eight counts. As may be seen by referring to FIGS. 10 and 11, the constituent element located at address X1, Y9 in memory 102 is read out eight times in the horizontal position. In the particular example illustrated herein, character code generator 112 generates a digital signal representative of an X. Therefore, in FIG. 11, eight X's are generated across the top line.

Modulo eight counter 305 generates an input to X address register and counter 301 via line 115 upon every eighth count. This signal on line 115 steps the X address register and counter 301 one position to the right. The stepping of the X register and counter one position to the right then causes the next memory location to the right to be read out of memory 102. In the example shown, the second position to the right on the top line is a blank and will be read out eight times in a similar manner. More specifically, the address designated in FIG. 10 as Y9, X2 will be read out eight times. This will cause the beam of CRT 28 to be advanced eight positions to the right on the top line in FIG. 11. However, since no constituent element or dot was located in the position Y9, X2, nothing will be formed on the face of the CRT and nothing will be photographically printed on the microfiche.

The data stored in memory 102 will be read out in a similar manner horizontally across the top line of memory. The X address register 301 is stepped horizontally one position after a particular position is read out eight times. When X register and counter 301 is counted up to a count corresponding to the last horizontal bit position in a row, X address register and counter 301 generates a signal on line 120 which causes the Y position register 22 in FIG. 6 to be stepped one position down. When X address register and counter 301 reaches its limit, it automatically resets itself. That is, it overflows to 0. The stepping of the Y position register 22 automatically resets the X position register 20 via line 21 in FIG. 6. Therefore, a second row of characters will be generated identical to that of the first row of characters. This will continue until modulo seven counter 306 is counted up to 7. When modulo seven counter 306 is counted up to 7, a signal will be generated on line 307 which will cause Y address register and counter 300 to be counted down one address position. Therefore, an image corresponding to eight normal character widths and seven character heights will be generated for the elements stored at position Y9, X1 in memory 102.

In a similar manner, the next row of information stored in memory 102, corresponding to line Y8, will be read out of memory. Each bit position of information will be repeated eight times in the horizontal direction and seven times in the vertical direction. When the Y address register and counter 300 is stepped down to 0 and an output is generated on line 307 by modulo seven counter 306, AND gate 308 will generate an input to read control unit 108 which stops the reading operation.

After the characters MI have been formed as shown in FIG. 11 above the second column in FIG. 12, the pages in the second column are photographically printed from top to bottom. After the pages in the second column are printed, the above-described process repeats itself except that the third and fourth characters of the title stored in memory 64 are read out and their constituent elements stored in memory 102. In the example shown in FIG. 12, the third and fourth characters are "LL". These characters are then expanded by reading each constituent element of the character out eight times in the horizontal direction and seven times in the vertical direction as described for the first two characters. This process then repeats itself for the remainder of the eye readable title to be generated on the microfiche.

After the eye readable title and all of the pages of the microfiche except the one in the lower righthand corner have been photographically printed, an index is generated in the page indicated at 602. Referring now to FIG. 9, there is shown an index page generator. An index page may be generated in accordance with the present invention by backing a tape or other storage device containing the information from which the microfiche was generated. A predetermined number of characters are selected from a predetermined position in each page of the microfiche. The preselected position for the extraction of this information is usually a title or heading which indicates the general nature of the subject matter within each page. Such a heading or title is conventionally located near the top of each page. Index information identifying the page location is added to the extracted information according to a standard format such as a numbering of the pages or combination of numbering and lettering of the pages.

Referring now in detail to FIG. 9, there is shown a column start selector 200, a row start selector 202, and a field length selector 204. Column start selector 200, row start selector 202, and field selector 204 may be digital thumb wheel switches. The count set into column start selector 200 is compared in comparator 206 with a count in column counter 210. Similarly, the count set into row start selector 22 is compared in comparator 208 with the count in row counter 212. Column counter 210 and row counter 212 receive inputs from data decoding and formatter control 14. When coincidence is detected on the inputs of comparators 206 and 208, an output is generated by AND gate 214 which provides a start extracting signal to index page formatter 216. Index page formatter 216 receives input data from input register 12 via line 63.

The number of characters desired to be extracted from each page is fed into field length selector 204. The count or number set into field length selector 204 is set into field length counter 218. Field length counter 218 is counted down by a character end signal from memory decoding unit 30 via line 31. When field length counter 218 is counted down to zero, a signal is generated on line 220 which is a stop extracting signal to index page formatter 216.

Index pagination storage unit 235 in conjunction with index page formatter 216 adds index information to the characters extracted from each page of the information which was photographically printed on the microfiche. In other words, index page formatter 216 takes the data read from tape unit 10 via input register 12 starting at the start column and start row for a number of characters determined by the count in the field length selector 204 and adds to it an index page location generated by index pagination storage unit 235. Unit 235 may be a read only memory or a counter which provides symbols in a set sequence which identifies the page location on the microfiche. For example, this may be in the form of A1, A2,...A16; B1, B2,...B16; ...F1, F2,...F16. In other words, the letters could be used to indicate a row and the numerals indicating a particular column. The output of index page formatter 216 is fed via line 51 to character generator control 32 and OR gate 100. This index information is then photographically printed in index page 602 in a manner similar to the information photographically printed in the other pages.

In order to backspace or rewind the tape to its exact starting position at the beginning of generation of the microfiche, it is necessary to record the amount of forward travel during the generation of microfiche. This function is accomplished by a block counter 242 and a character counter 243. Block counter 242 and character counter 243 are up/down counters. Block counter 242 receives a signal for each block from the COM tape control unit 13 via line 15. Similarly, character counter 243 receives an input from tape control unit 13 via line 19 in order to count the number of characters from the beginning of the first block to the position where the first page of the microfiche begins. If all the tapes or storage devices are arranged so that the first page of the microfiche always begins at the beginning of a block, character counter 243 would be unnecessary. However, in order to provide for the possibility that the first page of the microfiche may begin within the center of the block, character counter 243 is provided.

When the last page of the microfiche to be photographically printed is reached, a signal from camera control unit 16 via line 241 is provided to counter control unit 240. In response to the signal from camera control 16 indicating that the last page of the microfiche has been reached, counter control unit 240 reverses the direction of block counter 242 via line 245 causing block counter 242 to count downward. Simultaneously, counter control 240 provides a signal via line 17 to tape control unit 17 causing magnetic tape unit 10 to reverse the direction of tape movement or in other words to rewind the tape. This rewind signal remains on line 17 until block counter 242 indicates that the tape has been rewound to the beginning of the block in which the printing of the microfiche began. That is, block counter 242 is counted down to zero. A zero count in clock counter 242 also causes character counter 243 to reverse its direction of count, that is causing it now to count down, via line 247. In response to block counter 242 being counted down to 0, counter control unit 240 provides a signal on line 17 to tape control unit 13 which now causes tape unit 10 to proceed in the forward direction. As the tape unit 10 proceeds in the forward direction, character counter 243 is counted down to 0. In the simple case where the first page of the microfiche is always started on the tape at the beginning of a block, character counter 243 would be 0 at the same time that block counter 242 is counted down to 0. In either case, when AND gate 249 senses a 0 count output of block counter 242 and character counter 243, an enable signal is generated on line 251 which enables index page formatter 216. The extraction and printing of the index page then proceeds as described above.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for generating eye readable characters on a microfiche in a system for producing microfiche, said system producing characters comprised of predetermined elements, comprising:

first means for storing said characters which are to be eye readable;

second storage means, said second storage means being provided with a predetermined number of character element storage locations for each of a predetermined number of characters;

character generator means responsive to a said predetermined number of characters in siad first storage means for providing the elements of said predetermined number of characters for storage in said storage means;

means for reading out of said second storage means each element of each character a first predetermined number of times as the system traverses the microfiche in a first direction and a second predetermined number of times as the system traverses the microfiche in a second direction perpendicular to said first direction; and means for generating a predetermined character on the microfiche each time an element is read out of said second storage means.

2. Apparatus in accordance with claim 1 wherein said eye readable characters comprise a title on said microfiche.

3. Apparatus in accordance with claim 2 including means for extracting said characters comprising said title from a data train and storing said extracted characters in said first storage means.

4. Apparatus in accordance with claim 3 wherein said data train is the output of a tape transport.

5. Apparatus in accordance with claim 3 wherein said extracting means includes means for selecting the starting point for extraction of said characters comprising said title and means for selecting the field length of said title.

6. In an apparatus for generating a microfiche having means for receiving a data input train and a character pattern means for producing constituent elements of each character in the data input train, apparatus for generating a predetermined number of eye readable characters on said microfiche, comprising:

means for extracting said predetermined number of characters from said data input train;

means for reading the constituent elements of each of said extracted characters from said character pattern means;

means for storing the constituent elements, read out of said character pattern means, of each of said extracted characters in locations determined by address signals generated by said character pattern means;

means for reading out of said storage means each constituent element of each said characters stored in said storage means a first predetermined number of times as the microfiche is traversed in a horizontal direction and a second predetermined number of times as the microfiche is traversed in a vertical direction; and means for generating a character on the microfiche in response to each time a constituent element is read out of said storage means.

7. Apparatus in accordance with claim 6 including a reversible data storage device for supplying the data input train and an index page generator, said index page generator comprising means for causing said reversible data storage device to return to its starting position at the beginning of the generation of the microfiche, means for extracting a predetermined number of characters from the data input train at a position corresponding to a preselected position within each page of the microfiche, means for adding index information to the extracted characters and means for generating said extracted characters and index information on an index page of said microfiche.

8. Apparatus in accordance with claim 6 wherein said extracting means includes means for selecting the starting point for extraction of said characters from said data input train and means for selecting the number of characters to be extracted.

9. In an apparatus for generating a microfiche having means for receiving a digital data input and means for producing a character pattern for each character of digital data input for display on an imaging device, said character pattern including elements located at predetermined address positions, said microfiche having a first predetermined number of columns and a second predetermined number of rows, apparatus for generating a third predetermined number of eye readable characters above one or more of the columns of pages on said microfiche, comprising:

means for extracting a fourth predetermined number of characters from said digital data input during the generation of the first column of said first predetermined number of columns of said microfiche;

first means for storing said fourth predetermined number of digital characters extracted from said digital data input;

means responsive to the detection of the generation of the last page of a column for causing the readout of a said third predetermined number of digital characters stored in said first storage means for addressing said character pattern means;

second storage means for storing the character pattern of said third predetermined number of digital characters read out of said first storage means;

means for reading out of said second storage means each element of each character pattern a fifth predetermined number of times as the microfiche is traversed in a horizontal direction and a sixth predetermined number of times as the microfiche is traversed in a vertical direction; and means for generating a character on the microfiche each time a constituent element is read out of said second storage means.

10. Apparatus in accordance with claim 9 wherein said first predetermined number is 16, said second predetermined number is 13, said third predetermined number is 2, said fourth predetermined number is a preselected number less than 30, said fifth predetermined number is 8 and said sixth predetermined number is 7.

11. Apparatus in accordance with claim 9 including a reversible data storage device for supplying the digital data input and an index page generator, said index page generator comprising means for causing said reversible data storage device to return to its starting position at the beginning of the generation of the microfiche, means for extracting a predetermined number of characters from the data input train at a position corresponding to a preselected position within each page of the microfiche, means for adding index information to the extracted characters and means for generating said extracted characters and index information on an index page of said microfiche.

12. Apparatus in accordance with claim 9 wherein said extracting means includes means for selecting the starting point for extraction of said characters from said digital data input and means for selecting the number of characters to be extracted.

13. Apparatus in accordance with claim 9 wherein said eye readable characters comprise a title on said microfiche.

* * * * *